(12) United States Patent
Hoffmann (10) Patent No.: US 10,288,410 B2
(45) Date of Patent: May 14, 2019

(54) METHOD AND SYSTEM FOR IDENTIFYING WIRE CONTACT INSERTION HOLES OF A CONNECTOR

(71) Applicant: THE BOEING COMPANY, Chicago, IL (US)

(72) Inventor: Heiko Hoffmann, Malibu, CA (US)

(73) Assignee: THE BOEING COMPANY, Chicago, IL (US)

(*) Notice: Subject to any disclaimer, the term of this patent is extended or adjusted under 35 U.S.C. 154(b) by 20 days.

(21) Appl. No.: 15/348,569

(22) Filed: Nov. 10, 2016

(65) Prior Publication Data

US 2018/0130218 A1    May 10, 2018

(51) Int. Cl.
| | |
|---|---|
| *G01B 11/00* | (2006.01) |
| *G01J 3/46* | (2006.01) |
| *G06T 7/00* | (2017.01) |
| *G06T 7/70* | (2017.01) |
| *G06T 7/90* | (2017.01) |
| *H01R 43/08* | (2006.01) |
| *H04N 7/18* | (2006.01) |
| *H01R 43/20* | (2006.01) |

(52) U.S. Cl.
CPC ............ *G01B 11/002* (2013.01); *G01J 3/46* (2013.01); *G06T 7/0004* (2013.01); *G06T 7/70* (2017.01); *G06T 7/90* (2017.01); *H01R 43/20* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 6,704,102 B2* | 3/2004 | Roelke | ................. | G01B 11/024 |
| | | | | 356/243.1 |
| 6,804,387 B1* | 10/2004 | Sakaue | ................ | G06K 9/6203 |
| | | | | 382/141 |

(Continued)

FOREIGN PATENT DOCUMENTS

| | | |
|---|---|---|
| JP | H 0914919 | 1/1997 |
| JP | 2016/058320 | 4/2016 |

OTHER PUBLICATIONS

Choe, Yungeun, Hoo-Cheol Lee, Young-Joong Kim, Dae-Hie Hong, Sin-Suk Park, and Myo-Taeg Lim. "Vision-based estimation of bolt-hole location using circular hough transform." In ICCAS-SICE, 2009, pp. 4821-4826. IEEE, 2009.*

(Continued)

*Primary Examiner* — Michelle M Entezari
(74) *Attorney, Agent, or Firm* — Alson & Bird LLP (57) ABSTRACT

A method, system and computer program product are provided for identifying wire contact insertion holes of a connector to facilitate the automated insertion of the wire ends of a wire bundle assembly into the wire contact insertion holes of a connector. In the context of a method, each of a plurality of pixels of an image of the connector is analyzed to identify one or more candidate contact insertion holes for the connector. The method also determines whether the one or more candidate contact insertion holes are to be consolidated and, if so, consolidates the one or more candidate contact insertion holes. The method further includes assigning contact identification numbers of the connector to the one or more candidate contact insertion holes.

20 Claims, 4 Drawing Sheets

(56) References Cited

U.S. PATENT DOCUMENTS

| | | | | |
|---|---|---|---|---|
| 6,885,369 | B2* | 4/2005 | Tanahashi | G06T 7/0002 |
| | | | | 324/760.01 |
| 6,888,962 | B1 | 5/2005 | Sonoda et al. | |
| 8,494,304 | B2 | 7/2013 | Venable et al. | |
| 8,538,132 | B2* | 9/2013 | Kessler | G06T 7/0006 |
| | | | | 348/94 |
| 8,665,499 | B2* | 3/2014 | Malik | H04N 1/4092 |
| | | | | 358/3.04 |
| 8,722,357 | B2* | 5/2014 | Baer | G01N 1/2813 |
| | | | | 156/251 |
| 8,832,934 | B2 | 9/2014 | Larisch | |
| 9,135,511 | B2* | 9/2015 | Hayakawa | G06K 9/00805 |
| 9,292,725 | B2* | 3/2016 | Salvi | G06K 7/1456 |
| 9,384,541 | B2* | 7/2016 | Yoshimatsu | G01N 21/9515 |
| 9,445,713 | B2* | 9/2016 | Douglas | A61B 1/00009 |
| 9,715,100 | B2* | 7/2017 | Konomura | G02B 23/2484 |
| 2004/0179719 | A1* | 9/2004 | Chen | G06K 9/00234 |
| | | | | 382/118 |
| 2005/0235491 | A1 | 10/2005 | MacNutt et al. | |
| 2007/0277372 | A1* | 12/2007 | Aida | H01R 43/28 |
| | | | | 29/747 |
| 2009/0199396 | A1 | 8/2009 | Shelley et al. | |
| 2014/0293383 | A1* | 10/2014 | Ozawa | H04N 1/2338 |
| | | | | 358/538 |
| 2015/0120047 | A1* | 4/2015 | Motoyoshi | B25J 9/1697 |
| | | | | 700/253 |
| 2015/0320299 | A1* | 11/2015 | Krupnik | A61B 1/00009 |
| | | | | 348/65 |
| 2017/0061595 | A1* | 3/2017 | Suzuki | G06T 5/40 |
| 2017/0160077 | A1* | 6/2017 | Featherstone | G01B 11/2433 |
| 2017/0193330 | A1* | 7/2017 | Zhang | G06K 9/6215 |
| 2018/0047150 | A1* | 2/2018 | Chang | G06T 7/0004 |
| 2018/0129894 | A1* | 5/2018 | Nuske | G06T 7/62 |

OTHER PUBLICATIONS

Choe, Y. et al., *Vision-Based Estimation of Bolt-Hole Location Using Circular Hough Transform,* Proceedings ICCAS-SICE 2009—ICROS-SICE International Joint Conference, Art. No. 5334375, (2009) 4821-4826.

Davies, E. R. et al., *An Analysis of Hole Detection Schemes,* Proc. British Machine Vision Assoc. Conf., Oxford (Sep. 24-27, 1990), pp. 285-290.

Duda, R. O. et al., *Use of the Hough Transformation to Detect Lines and Curves in Pictures,* Comm ACM, 15(1), (1972) 11-15.

Press, W. H. et al., *Numerical Recipes in C: The Art of Scientific Computing,* Chapter 10, Cambridge University Press (1993), 412-420.

Shapiro, L. et al., *Binary Image Analysis,* Chapter 3, Computer Vision (Mar. 2000), 63-105.

Tipping, M. e. et al., *Mixtures of Probabilistic Principal Component Analyzers,* Neural Computation, 11 (1999) 443-482.

Image Analysis and Processing—National Instruments [online] [retrieved Dec. 7, 2016]. Retrieved from the Internet: <URL: http://www.ni.com/white-paper/3470/en/ >. (dated Aug. 24, 2016) 6 pages.

Measure and Analyze Cell Intensities—Image-Pro Plus Software—YouTube [online] [retrieved Dec. 7, 2016]. Retrieved from the Internet: <URL: https://www.youtube.com/watch?v=1Y_whhn5rtA>. (dated Jul. 6, 2010) 2 pages.

Measure properties of image regions—MATLB regionprops [online] [retrieved Dec. 7, 2016]. Retrieved from the Internet: <URL: http://www.mathworks.com/help/images/ref/regionprops.html >. (undated) 10 pages.

Extended European Search Report for European Application No. 17199925.3 dated Feb. 8, 2018.

\* cited by examiner

METHOD AND SYSTEM FOR IDENTIFYING WIRE CONTACT INSERTION HOLES OF A CONNECTOR

TECHNICAL FIELD

A method, system and computer program product are provided in accordance with an example embodiment in order to identify wire contact insertion holes of a connector to facilitate, for example, automated insertion of wire ends into respective wire contact insertion holes of a connector.

BACKGROUND

Wire bundles consisting of a plurality of wires are utilized in a variety of industries to carry a myriad of different types of signals. The wire of a wire bundle assembly must frequently be terminated with a wire contact and the resulting wire end is inserted into a wire contact insertion hole of a connector, such as a rubber grommet connector. As each wire of a wire bundle is unique and may carry a different type of signal, the wire ends of a wire bundle assembly must be inserted into specific wire contact insertion holes of a connector in order to make the proper connections.

The wire ends of a wire bundle assembly may be manually inserted into the respective wire contact insertion holes defined by a connector. As wire bundle assemblies commonly include hundreds of wires, this manual connection process may be relatively time consuming and error prone and, as a result, may increase the cost of the overall assembly including the wire bundle assembly. As such, automated techniques to insert the wire ends of a wire bundle assembly into the wire contact insertion holes of a connector have been developed in an effort to reduce the time expended to make the connections and to correspondingly reduce the cost of the resulting assembly. However, wire bundle assembly machines generally require the connectors to be in a very restricted and controlled set of locations in order to increase the likelihood that the wire ends of the wire bundle assembly may be properly inserted into the wire contact insertion holes of the connector. As such, wire bundle assembly machines limit the flexibility with which connectors may be presented and, as such, are not suitable for all scenarios.

BRIEF SUMMARY

A method, system and computer program product are provided for identifying wire contact insertion holes of a connector so as to facilitate the automated insertion of the wire ends of a wire bundle assembly into the wire contact insertion holes of a connector. By facilitating the automated insertion of the wire ends of a wire bundle assembly into the wire contact insertion holes of a connector, the time required to establish such connections and correspondingly the cost associated with the resulting assembly may be reduced while reducing the error rate associated with the connections. The method, system and computer program product of an example embodiment provide substantial flexibility in relation to the manner in which the connector may be located, while still permitting the wire ends of a wire bundle assembly to be securely inserted into and electrically connected to the appropriate wire contact insertion holes of the connector.

In an example embodiment, a method for identifying wire contact insertion holes defined by a connector is provided that includes analyzing each of a plurality of pixels of an image of the connector to identify one or more candidate contact insertion holes for the connector. The method also determines whether the one or more candidate contact insertion holes are to be consolidated and, if so, consolidates the one or more candidate contact insertion holes. Following consolidation, the method further includes assigning contact identification (ID) numbers of the connector to the one or more candidate contact insertion holes.

The method of an example embodiment additionally includes determining whether the one or more candidate contact insertion holes include one or more outliers, and if so, eliminating the one or more candidate contact insertion holes that is the outlier from further consideration. Additionally or alternatively, the method of an example embodiment eliminates one or more outliers during or after assigning contact ID numbers of the connector to the one or more candidate contact insertion holes. The method of an example embodiment also includes assigning locations in a connector-based coordinate system to the one or more candidate contact insertion holes following consolidation and elimination of the one or more outliers. The method of this example embodiment also includes determining the candidate contact insertion hole into which a wire end is to be inserted based upon the contact ID number of the candidate contact insertion hole and determining a position of a robotic end-effector utilized to insert the wire end into the candidate contact insertion hole based upon the location of the candidate contact insertion hole in the connector-based coordinate system.

The method of an example embodiment analyzes each of the plurality of pixels of the image by identifying a pixel as a candidate contact insertion hole in an instance in which the pixel has a color that satisfies a predefined criteria and is at least partially surrounded by a plurality of pixels that have a color that is different than the color of the pixel and that satisfies a second predefined condition. The second predefined condition is different than the first predefined condition. In this regard, the second predefined condition may be defined based upon the color of the pixel such that the pixel identified as a candidate contact insertion hole is darker than the plurality of pixels that at least partially surround the pixel. The method of an example embodiment consolidates the one or more candidate contact insertion holes by consolidating a plurality of neighboring candidate contact insertion holes to a single candidate contact having a location based upon a combination of locations of the plurality of candidate contact insertion holes that are consolidated. In an example embodiment, the method assigns contact ID numbers by comparing a predetermined template of contact locations of the connector to the candidate contact insertion holes. In this example embodiment, the method compares the predetermined template of contact locations of the connector to the candidate contact insertion holes by modifying a position of the predetermined template relative to the candidate contact insertion holes to identify a closest match between the predetermined template and the candidate contact insertion holes.

In another example embodiment, a system is provided for identifying wire contact insertion holes defined by a connector. The system includes a camera configured to capture an image of the connector. The system also includes a computing device configured to analyze each of a plurality of pixels of the image of the connector to identify one or more candidate contact insertion holes for the connector. The computing device is also configured to determine whether the one or more candidate contact insertion holes are to be consolidated and, if so, to consolidate the one or more candidate contact insertion holes. Following consolidation, the computing devise is further configured to assign contact ID numbers of the connector to the one or more candidate contact insertion holes.

The computing device of an example embodiment is additionally configured to determine whether the one or more candidate contact insertion holes include one or more outliers and, if so, to eliminate the one or more candidate contact insertion holes that is the outlier from further consideration. In an example embodiment, the computing device is further configured to further eliminate one or more outliers during or after assigning contact ID numbers of the connector to the one or more candidate contact insertion holes. The computing device of the system of an example embodiment is also configured to assign locations in a connector-based coordinate system to the one on one candidate contact insertion holes following consolidation and elimination of the one or more outliers. In this regard, the computing device is also configured to determine the candidate contact insertion hole into which a wire end is to be inserted based upon the contact ID number of the candidate contact insertion hole and to determine a position of a robotic end-effector that is utilized to insert the wire end into the candidate contact insertion hole based upon the location of the candidate contact insertion hole in the connector-based coordinate system.

The computing device of the system of an example embodiment is configured to analyze each of the plurality of pixels of the image by identifying the pixel as a candidate contact insertion hole in an instance in which the pixel has a color that satisfy a first predefined criteria and is at least partially surrounded by a plurality of pixels that have a color that is different than the color of the pixel and that satisfy a second predefined criteria, different than the first predefined criteria. The second predefined criteria is defined based upon the color of the pixel such that the pixel identified as a candidate contact insertion hole is darker than the plurality of pixels that at least partially surround the pixel. The computing device of a system of an example embodiment is configured to consolidate the one or more candidate contact insertion holes by consolidating a plurality of neighboring candidate contact insertion holes to a single candidate contact insertion hole having a location based upon a combination of locations to the plurality of candidate contact insertion holes that are consolidated. The computing device of the system of an example embodiment is configured to assign contact ID numbers by comparing a predetermined template of contact locations of the connector to the candidate contact insertion holes. The computing device of this example embodiment is configured to compare the predetermined template of contact locations of the connector to the candidate contact insertion holes. The computing device of this example embodiment is configured to compare the predetermined template of contact locations of the connector to the candidate contact insertion holes by modifying a position of the predetermined template relative to the candidate contact insertion holes to identify the closest match between the predetermined template and the candidate contact insertion holes.

In a further example embodiment, a computer program product is provided for identifying wire contact insertion holes defined by a connector. The computer program product includes at least one non-transitory computer-readable storage medium having computer-executable program code instructions stored therein. The computer-executable program code instructions include program code instructions to analyze each of a plurality of pixels of an image of a connector to identify one or more candidate contact insertion holes for the connector. The computer-executable program code instructions also include program code instructions to determine whether the one or more candidate contact insertion holes are to be consolidated and, if so, to consolidate the one or more candidate contact insertion holes. The computer-executable program code instructions additionally include program code instructions to assign, following consolidation and elimination of one or more outliers, contact identification (ID) numbers to the one or more candidate contact insertion holes.

The computer-executable program code instructions of an example embodiment further include program code instructions to determine whether the one or more candidate contact insertion holes include one or more outliers, and, if so, to eliminate the one or more candidate contact insertion holes that is the outlier from further consideration. The computing device is further configured to further eliminate one or more outliers during or after assigning contact ID numbers of the connector to the one or more candidate contact insertion holes. The computer-executable program code instructions of an example embodiment also include program code instructions to assign locations in a connector-based coordinate system to the one or more candidate contact insertion holes following consolidation and elimination of the one or more outliers. In this example embodiment, the computer-executable program code instructions further include program code instructions to determine the candidate contact insertion hole into which a wire end is to be inserted based upon the ID number of the candidate contact insertion hole and to determine a position of a robotic end-effector that is utilized to insert the wire end into the candidate contact insertion hole based upon the location of the candidate contact insertion hole in the connector-based coordinate system. In an example embodiment, the program code instructions to analyze each of the plurality of pixels of the image include program code instructions to identify a pixel as a candidate contact insertion hole in an instance in which the pixel has a color that satisfies a predefined criteria and is at least partially surrounded by a plurality of pixels that have a color that is different than the color of the pixel and that satisfy a second predefined criteria, different then the first predefined criteria.

In a further example embodiment, an apparatus is provided for identifying wire contact insertion holes defined by a connector that includes means for analyzing each of a plurality of pixels of an image of the connector to identify one or more candidate contact insertion holes for the connector. The apparatus also includes means for determining whether the one or more candidate contact insertion holes are to be consolidated and, if so, means for consolidating the one or more candidate contact insertion holes. The apparatus additionally includes means for determining whether the one or more candidate contact insertion holes include one or more outliers, and if so, means for eliminating the one or more candidate contact insertion holes that is the outlier from further consideration. Following consolidation and elimination of one or more outliers, the apparatus further includes means for assigning contact identification (ID) numbers of the connector to the one or more candidate contact insertion holes.

BRIEF DESCRIPTION OF THE DRAWINGS

Having thus described certain example embodiments of the present disclosure in general terms, reference will hereinafter be made to the accompanying drawings which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system and computer program product are provided in accordance with an example embodiment in order to identify wire contact insertion holes defined by a connector. Although the method, system and computer program product may be configured to identify the wire contact insertion holes of a variety of different types of connectors, the connectors generally define a plurality of wire contact insertion holes within a housing with the wire contact insertion holes being arranged in a predefined configuration. Different connectors may include different numbers of wire contact insertion holes and may include wire contact insertion holes arranged in different configurations.

Figure 1:
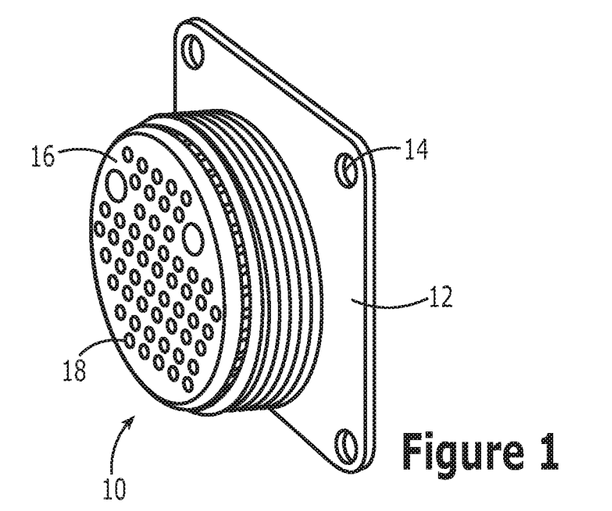
FIG. 1 is a perspective view of a rubber grommet connector.
Figure 2:
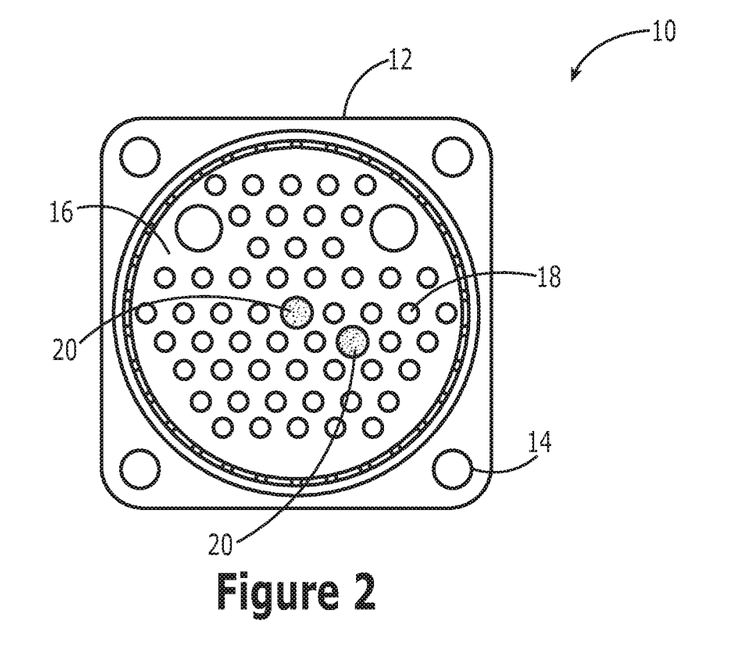
FIG. 2 is a front view of the rubber grommet connector of FIG. 1.

One example of a connector is depicted in FIGS. 1 and 2 in the form of a rubber grommet connector 10. As shown, the rubber grommet connector 10 includes a housing 12 and a rubber grommet 16 disposed therein. Although the housing 12 may be configured differently for other types of connectors, the housing of the rubber grommet connector 10 of the embodiment of FIGS. 1 and 2 is externally threaded to facilitate, for example, the secure threaded engagement of a wire bundle assembly or another connector therewith. The rubber grommet connector 10 of FIGS. 1 and 2 also includes a radially extending flange defining a plurality of openings 14, such as for receiving screws or other fasteners for mounting the connector to an assembly. Although the rubber grommet connector 10 of FIG. 1 has a cylindrical shape, the connector of other example embodiments may have different sizes and shapes. In regards to the example connector of FIGS. 1 and 2, a rubber grommet 16 is disposed within the housing and the rubber grommet defines a plurality of wire contact insertion holes 18. The wire contact insertion holes 18 defined by the rubber grommet 16 are configured, e.g., sized and shaped, such that a wire end consisting of a wire contact connected, e.g., crimped, to the end of a wire, is inserted into and mechanically retained within the wire contact insertion hole 18. In some, but not all embodiments, the rubber grommet may also include a plurality of wire contacts in alignment with respective wire contact insertion holes defined by the rubber grommet such that the wire end may be brought into secure electrical contact with a respective wire contact of the connector.

As shown by the example of the rubber grommet connector 10 of FIGS. 1 and 2, the plurality of wire contact insertion holes 18 defined by the rubber grommet 16, are arranged in a predefined pattern. In some embodiments, not all of the wire contact insertion holes of a connector 10 will be utilized and, instead, only a subset of the wire contact insertion holes will receive and make electrical connection with corresponding wire ends of the wire bundle assembly. As illustrated in FIG. 2, the wire contact insertion holes 18 defined by the rubber grommet 16 that are not to be utilized in conjunction with a particular application may be eliminated from further consideration by the insertion a plug 20 into the respective wire contact insertion hole defined by the rubber grommet. Although a rubber grommet connector 10 that may be analyzed in accordance with an example embodiment of the present disclosure is depicted in FIGS. 1 and 2 and will be described hereinafter, the method, system and computer program product of an example embodiment may be utilized in conjunction with a wide variety of other connectors and the rubber grommet connector is illustrated and described by way of example, but not of limitation.

Figure 3:
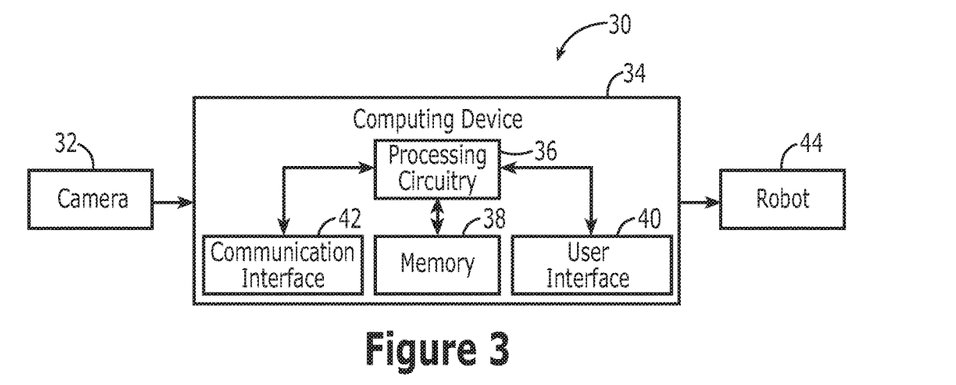
FIG. 3 is a block diagram of the system that may be specifically configured in accordance with an example embodiment of the present disclosure.

Referring now to FIG. 3, a system for identifying wire contact insertion holes of a connector 10 is depicted. As shown, the system 30 includes a camera 32 configured the capture an image of the connector 10. The camera 32 may be configured to capture a gray scale image of the connector 10. Alternatively, the camera 32 may be configured to capture a color image of the connector 10. In an embodiment in which a color image of the connector 10 is captured, the image associated with each different color channel of the camera 32, such as the red, green and blue color channels, may be averaged to create a composite image for subsequent analysis and review. Alternatively, the different color channels of the camera 32 may be separately analyzed. The camera 32 is generally configured to capture an image of the front face of the connector 10, such as shown in FIG. 2, such that the plurality of wire contact insertion holes 18 defined by the rubber grommet 16 are clearly visible. As such, the image captured by the camera 32 of an example embodiment coincides with or is parallel to a plane defined by the front face of the connector 10, such as defined by the front face of the rubber grommet 16 of the connector. Alternatively, the image plane of the image captured by the camera 32 of another example embodiment may be angularly offset from the plane defined by the front face of the connector 10, such as a front face defined by the rubber grommet 16 of the connector by no more than a predefined maximum angular offset, such as +1-15°.

In addition to the camera 32, the system 30 of FIG. 3 includes a computing device 34 configured to analyze the image of the connector 10 captured by the camera and to identify wire contact insertion holes of the connector. As also shown in FIG. 3, the system 30 of an example embodiment also includes or is in communication with a robot 44 and, more particularly, a robotic end effector that is utilized to insert wire ends into respective candidate contact insertion holes of the connector 10 based upon the identification of the wire contact insertion holes of the connector by the computing device 34.

The computing device 34 may be configured in various manners and, as such, may be embodied as a personal computer, a tablet computer, a computer workstation, a mobile computing device such as a smartphone, a server or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described. The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the system 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may include, for example, volatile and/or non-volatile memory. The memory 38 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image captured by the camera 32 and/or an image visually depicting the closest match between the candidate contacts and a predetermined template as described below. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data, such as by receiving images from the camera 32 and transmitting information, such as a list of candidate contact insertion holes, contact ID numbers and locations of the candidate contact insertion holes in a connector-based coordinate system, to a robot 44 and/or a robotic end-effector. Although referenced herein as candidate contact insertion holes, contact ID numbers and locations of the candidate contact insertion holes, the list of candidate contact insertion holes, contact ID numbers and locations of the candidate contact insertion holes is to be interpreted so as to be associated with the candidate contact insertion holes themselves and/or wire contacts aligned with the respective candidate contact insertion holes in those embodiments that include such wire contacts. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

Figure 4:
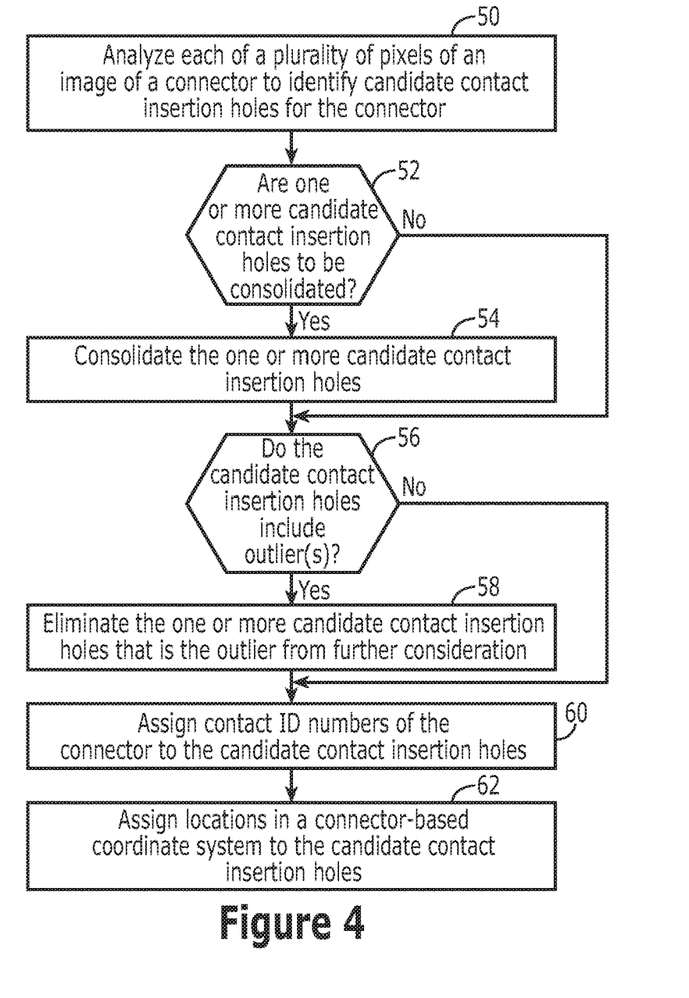
FIG. 4 is a flow chart illustrating operations performed, such as by the system of FIG. 3, for identifying wire contact insertion holes of a connector in accordance with an example embodiment of the present disclosure.

Referring now to FIG. 4, the operations performed, such as by the computing device 34 of FIG. 3, are depicted. Initially, the contact features are matched. As shown in block 50 of FIG. 4, the computing device 34, such as the processing circuitry 36, is configured to match the contact features by separately analyzing each of a plurality of pixels of the image of the connector 10 captured by the camera 32 to identify one or more candidate contact insertion holes for the connector. In this regard, the computing device 34, such as the processing circuitry 36, is configured in accordance with an example embodiment to separately analyze each of the plurality of pixels of the image by identifying a pixel as a candidate contact insertion hole in an instance in which the pixel (the central pixel) has a color that satisfies a first predefined criteria and is at least partially surrounded by a plurality of pixels (the surrounding pixels) that have a color that is different than the color of the central pixel and that have satisfied second predefined criteria, different than the first predefined criteria. For example, the second predefined criteria may be defined based upon the color of the pixels such that the pixel identified as a candidate contact insertion hole is darker than the plurality of pixels that at least partially surround the central pixel.

Although the criteria utilized in the analysis of the image to identify one or more candidate contact insertion holes of the connector 10 may vary based upon various factors, such as the color of the rubber grommet 16, the size of the wire contact insertion holes 18 defined by the rubber grommet or the like, the computing device 34, such as the processing circuitry 36, of an example embodiment is configured to identify candidate contact insertion holes for the connector from the image by identifying pixels that appear relatively dark and that are surrounded by a ring of more lightly colored pixels. This example analysis is largely premised on the appearance of the connector 10 as shown in FIG. 2 in which each wire contact insertion hole 18 defined by the rubber grommet 16 and correspondingly each candidate contact insertion hole of the connector 10 appears as a dark disk within the more lightly colored, rubber grommet.

As such, the computing device 34, such as the processing circuitry 36, of this example embodiment is configured to analyze each pixel of the image to identify whether the pixel has an intensity that satisfies a first predefined criteria. While the first predefined criteria may be defined in various manners, the first predefined criteria of an example embodiment is set to an intermediate value between the values associated with black and white pixels with the computing device 34, such as the processing circuitry 36, configured to identify those pixels having an intensity between the intermediate value and the value associated with a black pixel as pixels that satisfy the first predefined criteria. The intermediate value may be differently defined in various embodiments, but in one example embodiment is set to a predefined value of 0.21 on a scale of pixel intensities from 0 to 1 with 0 representing a black pixel and 1 representing a white pixel.

In an instance in which the computing device 34, such as the processing circuitry 36, identifies a pixel to satisfy the first predefined criteria, the computing device, such as the processing circuitry, then determines if the central pixel is at least partially surrounded by a ring of pixels of a predefined radius that satisfy the second predefined criteria, such as by having intensities that differ from the intensity of the central pixel by at least a predetermined threshold. Although the predetermined threshold by which the intensity of the pixels surrounding the central pixel differs from the intensity of the central pixel may vary in different embodiments, the predetermined threshold of an example embodiment is 0.05 on a scale of 0 to 1 with 0 representing a black pixel and 1 representing a white pixel. Thus, the intensity value of the pixels surrounding the central pixel must exceed the intensity value of the central pixel by at least 0.05 to merit further consideration.

In order to increase the efficiency with which the computing device 34, such as the processing circuitry 36, analyzes the pixels surrounding the central pixel to determine if the central pixel is at least partially surrounded by a ring of more lightly colored pixels as evidenced by surrounding pixels having intensity values that exceed the intensity value of the central pixel by the predetermined threshold, the computing device 34, such as the processing circuitry 36, of an example embodiment is configured not to analyze all of the pixels of the image but, instead, to analyze the pixels within a predefined distance, such as a predefined radius, of the pixel in question. The distance, such as the radius, may vary depending upon the size of the wire contact insertion holes 18 defined by the rubber grommet 16. In an example embodiment, however, a ring of pixels between an inner radius and an outer radius may be defined for purposes of further consideration. While the inner and outer diameters of the ring of pixels may be defined in various manners, the outer diameter of the ring may be defined based upon the size of the outer diameter of indentations defined by the rubber grommet 16 in association with the wire contact insertion holes 18 defined thereby. For example, a ring of pixels between an inner radius of 7 pixels from the central pixel and an outer radius of 15 pixels from the central pixel may be analyzed in an example embodiment in which a circle have a radius of 15 pixels is approximately equal in size to the outer diameter of the indentations defined by the rubber grommet 16 in association with the wire contact insertion holes 18 defined thereby.

In this example embodiment, the computing device 34, such as the processing circuitry 36, is then configured to analyze the intensity of the pixels within the ring defined about the central pixel and to determine whether the intensity of the pixels within the ring differ from the intensity of the central pixel by at least the predetermined threshold, such as by at least 0.05 in an example embodiment. The computing device 34, such as the processing circuitry 36, of an example embodiment does not require every pixel within the ring to have an intensity that varies from the intensity of the central pixel by at least the predetermined threshold. Instead, the computing device 34, such as the processing circuitry 36, of an example embodiment requires at least a predetermined number of pixels, such as 30 pixels, or a predetermined percentage of pixels in the ring to have an intensity that differs from the intensity of the central pixel by at least a predetermined threshold in order to conclude that the central pixel is surrounded by a ring of more lightly colored pixels. The number of surrounding pixels required to have an intensity that differs from the intensity of the central pixel by at least a predetermined threshold may be set to different values. However, the number of surrounding pixels of an example embodiment is set to a value that does not exceed $2\pi r$ wherein r is the inner radius in terms of the number of pixels.

As described above, the computing device 34, such as the processing circuitry 36, of this example embodiment is configured to identify pixels that vary in color relative to a ring of pixels that surround the central pixel, such as being darker than a surrounding ring of more lightly colored pixels. The central pixel may not be entirely surrounded by pixels of a different color, such as more lightly colored pixels. Instead, the central pixel must be at least partially surrounded by a plurality of pixels having a different color, such as defined by the predetermined number or percentage of pixels within the ring that must satisfy the predetermined threshold. Following the identification of pixels as candidate contact insertion holes, the computing device 34, such as the processing circuitry 36, is configured to revise the image and/or a copy of the image accordingly. In an example embodiment, the pixels that are identified as candidate contact insertion holes continue to have their original intensity, while all other pixels that have not been identified as candidate contact insertion holes are set to an intensity that is equal to white, such as an intensity of 1.

In instances in which the camera 32 has captured a color image, the different color channels of the camera may be combined as described above as to define a single image that may be analyzed as described above and in the same manner as a gray scale image. However, in an embodiment in which the image to be analyzed comprises two or more, such as three differently colored images, such as a red image, a green image and a blue image, the image having a color corresponding to the color of the rubber grommet 16, such as the red image in an embodiment in which the rubber grommet is red, is analyzed by the computing device 34, such as the processing circuitry 36, as described above in order to identify whether a ring of pixels that satisfies the predetermined threshold surrounds a central pixel without correspondingly analyzing the other images, such as the green and blue images. In this example embodiment, the computing device 34, such as the processing circuitry 36, is also configured to determine whether the image of the same or similar color as the rubber grommet 16, such as the red image, has an intensity that exceeds the intensities of the other images, such as the green and blue images, by at least a predefined threshold, such as 0.1, in order to identify a pixel as a candidate contact insertion hole.

After matching the contact features, candidate contact insertion holes are consolidated in instances in which two or more pixels of the image that have been identified as candidate contact insertion holes for the connector 10 are determined to represent the same candidate contact insertion hole. In this regard, the computing device 34, such as the processing circuitry 36, is configured to determine whether the one or more candidate contact insertion holes that have been identified by analysis of the image are to be consolidated as shown in block 52 of FIG. 4. In an instance in which a determination is made that one or more candidate contact insertion holes are to be consolidated, the computing device 34, such as the processing circuitry 36, is configured to consolidate the one or more candidate contact insertion holes into a single candidate contact insertion hole as shown in block 54 of FIG. 4. In an example embodiment, the computing device 34, such as the processing circuitry 36, is configured to consolidate the one or more candidate contact insertion holes by consolidating a plurality of neighboring candidate contact insertion holes into a single candidate contact insertion hole having a location based upon a combination of locations of the plurality of candidate contact insertion holes that are consolidated. For example, the location of the single candidate contact insertion hole following consolidation may be the average location of the plurality of the neighboring candidate contact insertion holes that are consolidated.

Building upon the foregoing example in which all pixels that have not been identified as being a candidate contact insertion hole have been set to have an intensity of 1, the computing device 34, such as the processing circuitry 36, of an example embodiment considers each pixel in turn. For each pixel having an intensity that is other than white, such as an intensity of less than 1, the computing device 34, such as the processing circuitry 36, defines a window of neighboring pixels for subsequent analysis. The window may be predefined to have different sizes and, in some embodiments, different dimensions in both the vertical and horizontal dimensions. In an example embodiment, however, the window of neighboring pixels to be investigated has a size of +/−10 pixels in both the vertical and horizontal dimensions. Within the window of neighboring pixels, the computing device 34, such as the processing circuitry 36, is configured to remove any pixels both having an intensity representative of a color other than white, such as an intensity of less than 1, and lacking any direct neighboring pixel having an intensity representative of a color other than white, such as an intensity of less than 1, as such isolated pixels may be considered to represent noise in the image. In this regard, the removal of a pixel may be accomplished by setting the intensity of the pixel to be removed to be representative of a white pixel, such as by setting the intensity to equal 1.

For all other pixels within the window having both an intensity representative of a color other than white, such as an intensity of less than 1, and at least one neighboring pixel that is also representative of a color other than white, such as by having an intensity of less than 1, the computing device 34, such as the processing circuitry 36, determines the average location of the neighboring pixels. In regards to the determination of the average location, the location of each pixel to be included within the average may be weighted based upon the corresponding intensity of the pixel. For example, the weight assigned to a respective pixel may be defined as: weight=(1−intensity). In an instance in which the number of neighboring pixels that are included within the average satisfies a predefined threshold, such as by being two or more pixels, the average location of the neighboring pixels may be stored, such as in the memory 38, as a candidate contact insertion hole. Following processing of a window of neighboring pixels, the computing device 34, such as the processing circuitry 36, may be configured to set the intensity for all pixels within the window to correspond to pixels of a white color, such as by setting the intensity of all pixels within the window to equal 1. As such, the pixels within the neighboring window will not be considered during the analysis of another neighboring window about another pixel of the image, thereby avoiding double counting of pixels within nearby overlapping windows.

Following the consolidation of candidate contact insertion holes, outliers may optionally be discarded. Outliers are generally considered to be candidate contact insertion holes that are not, in fact, wire contact insertion holes. In this regard, a shaded area adjacent to wire plug 20 may appear during the image processing to be a candidate contact insertion hole, but is not, in fact, a candidate contact insertion hole. In this regard, the computing device 34, such as the processing circuitry 36, of an example embodiment is configured to determine whether the one or more candidate contact insertion holes include one or more outliers as shown in block 56 of FIG. 4. In an instance in which the one or more candidate contact insertion holes include one or more outliers, the computing device 34, such as the processing circuitry 36, of this example embodiment is configured to eliminate the one or more candidate contact insertion holes that is an outlier from further consideration. See block 58 of FIG. 4.

In order to identify an outlier so as to facilitate the subsequent elimination of the outlier, the visual appearance of each candidate contact insertion hole location is analyzed. In an example embodiment, the computing device 34, such as the processing circuitry 36, is configured to identify and store the intensity values of each pixel that defines a predetermined shape, such as a circle of a predefined radius, e.g., 7 pixels, around the location of a candidate contact insertion hole. This array of intensity values effectively provides a fingerprint of the location of the candidate contact insertion hole which may then be further evaluated as wire contact insertion holes generally have relatively common or similar fingerprint. In an example embodiment, the computing device 34, such as the processing circuitry 36, is configured to express each array as a vector in a multi-dimensional space and to then normalize each vector to have a unit length. In an example embodiment, the computing device 34, such as the processing circuitry 36, is configured to compare the vector to a predefined prototypical vector representative of a wire contact insertion hole. While the comparison may be performed in various manners, the computing device 34, such as the processing circuitry 36, of an example embodiment is configured to compare the vector to a predefined prototypical vector by computing the Euclidean distances between the vectors in the multi-dimensional space. In this example embodiment, a candidate contact insertion hole for which the Euclidean distance exceeds a predefined threshold, such as 0.25, is identified as an outlier and is subsequently eliminated from further consideration, such as by being removed from the list of candidate contact insertion holes.

The predefined prototypical vector may be defined in various manners. In an example embodiment, the prototypical vector is determined from the candidate contact insertion hole having the largest sum of pixel weights (as determined in conjunction with the determination of the average location of a plurality of neighboring candidate contact insertion holes) since this candidate contact insertion hole is likely the most visible candidate contact insertion hole. Alternatively, the prototypical vector may be predefined without relation to the analysis of the connector 10 at issue. Still further, the prototypical vector maybe defined from a distribution of points representative of true wire contact insertion holes, such as by utilizing a Gaussian mixture model with the Euclidean distances then determined relative to such a distribution.

Once the outliers have been discarded, contact identification (ID) numbers may be assigned to the one or more candidate contact insertion holes. In this regard, following consolidation and the optional elimination of one or more outliers, the computing device 34, such as the processing circuitry 36, is configured to assign contact ID numbers of the connector 10 to the one or more candidate contacts. See block 60 of FIG. 4. In order to assign contact ID numbers, a template of the known locations of the contacts of a connector 10 of the same type as that being subjected to analysis may be compared to the locations of the candidate contacts in order to determine a best match of the template to the locations of the candidate contacts. Wire contacts or the openings defined by the rubber grommet into which plugs are inserted may be removed from the template of known locations prior to the assignment of contact ID numbers. Once matched, the contact ID numbers of the different wire contacts of the template may be used to assign the contact ID numbers of the corresponding candidate contacts of the connector 10 under analysis.

Figure 5:
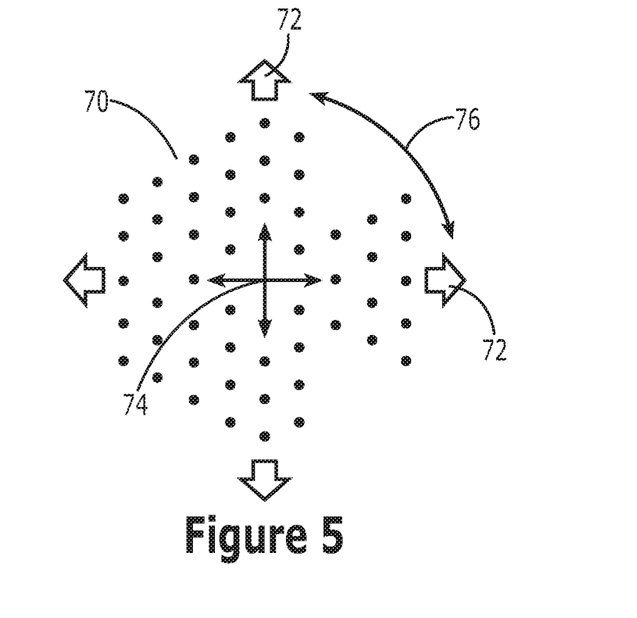
FIG. 5 illustrates a predetermined template of contact locations and depicts the manner in which the template may be scaled, translated or rotated during a comparison with the candidate contact insertion holes for a connector in accordance with an example embodiment of the present disclosure.

In this regard, the computing device 34, such as the processing circuitry 36, of an example embodiment is configured to assign contact ID numbers by comparing a predetermined template of contact locations of the connector 10 to the candidate contact insertion holes. In comparing the predetermined template, such as defined by a computer aided design (CAD) drawing, the computing device 34, such as the processing circuitry 36, of an example embodiment is configured to modify the position of the predetermined template relative to the candidate contact insertion holes to identify a closest match between the predetermined template and the candidate contact insertion holes. The position of the predetermined template may be modified in various manners. As shown in FIG. 5, a predetermined template 70 of the wire contact insertion holes of a connector 10 of the type under analysis is depicted. In relation to the modification of the position of the predetermined template 70 in order determine the closest match between the predetermined template and the candidate contact insertion holes, the predetermined template may be scaled so as to be larger or smaller as indicated by the outwardly facing arrows 72 about the periphery of the predetermined template of FIG. 5. Additionally or alternatively, the predetermined template 70 may be translated, such as by being moved in a horizontal direction, a vertical direction or a combination of the horizontal and vertical directions as indicated by the double headed horizontal and vertical arrows 74 in the center of the predetermined template of FIG. 5. Additionally or alternatively, the predetermined template 70 may be rotated as indicated by the arcuate double headed arrow 76 of FIG. 5. By scaling, translating and/or rotating the predetermined template 70 in various manners, the computing device 34, such the processing circuitry 36, is configured to identify the position of the predetermined template, that is, the scale, the translation and the rotation of the predetermined template, relative to the candidate contact insertion holes that create the closest match between the predetermined template and the candidate contact insertion holes.

The closest match may be defined in various manners. In an example embodiment, however, the computing device 34, such as the processing circuitry 36, is configured to determine a cost function that is the sum of square distances between each candidate location and the closest corresponding location of a wire contact insertion hole as defined by the predetermined template 70. This cost function may be determined for each different position of the predetermined template 70. The position of the predetermined template 70 that most closely matches the candidate contact insertion holes is then identified based upon the optimization of the cost function, such as by Powell's method.

Once the position of the predetermined template 70 relative to the candidate contact insertion holes is determined in terms of scale, translation and rotation that causes the closest match between the predetermined template and the candidate contact insertion holes, each candidate contact is assigned a contact ID number based upon the contact ID number of the corresponding wire contact insertion hole of the predetermined template. Additionally, the computing device 34, such as the processing circuitry, of an example embodiment is configured to assign a location in a connector-based coordinate system to each candidate contact insertion hole following the consolidation or elimination of one or more outliers and, more particularly, following the identification of a closest match between the predetermined template 70 and the candidate contact insertion holes. See block 62 of FIG. 4. The location assigned to a candidate contact insertion hole in a connector-based coordinate systems assigns a location in terms of the real-world coordinate system, as opposed to the image coordinates. For example, for a predefined type of connector, the location assigned to a candidate contact insertion hole identifies the (x,y) position of the candidate contact insertion hole for a coordinate system defined by the connector. As such, a list of candidate contact insertion holes with associated contact ID numbers and locations in the connector-based coordinate system, that is, in real-world coordinates, may be stored, such as by the memory 38.

In conjunction with or following the assignment of locations to the candidate contact insertion holes, the computing device 34, such as the processing circuitry 36, may be configured to additionally remove candidate contact insertion holes that are an outlier, but that were not previously identified as an outlier. In this regard, candidate contact insertion holes that do not closely match a corresponding wire contact insertion hole of the predetermined template 70 may be identified as an outlier and removed from subsequent consideration. For example, the computing device 34, such as the processing circuitry 36, may be configured to identify a candidate contact insertion hole having a distance in image coordinates that exceeds a predefined threshold, such as 7 pixels, to the nearest corresponding location of a wire contact insertion hole in the predetermined template 70 and may label such a candidate contact insertion hole as an outlier for subsequent removal from the list of candidate contact insertion holes.

Figure 6:
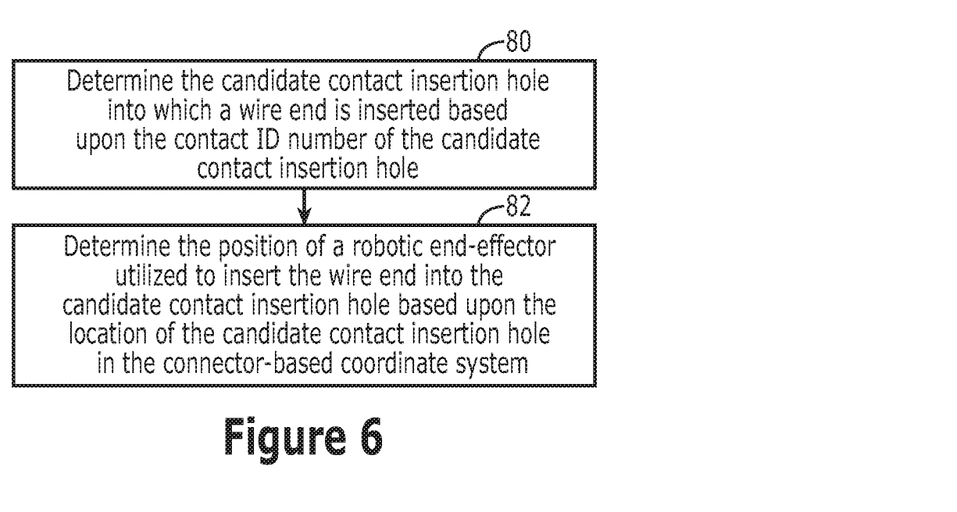
FIG. 6 is a flow chart illustrating operations performed in order to insert a wire end into a candidate contact insertion hole of a connector in accordance with an example embodiment of the present disclosure.
Figure 7:
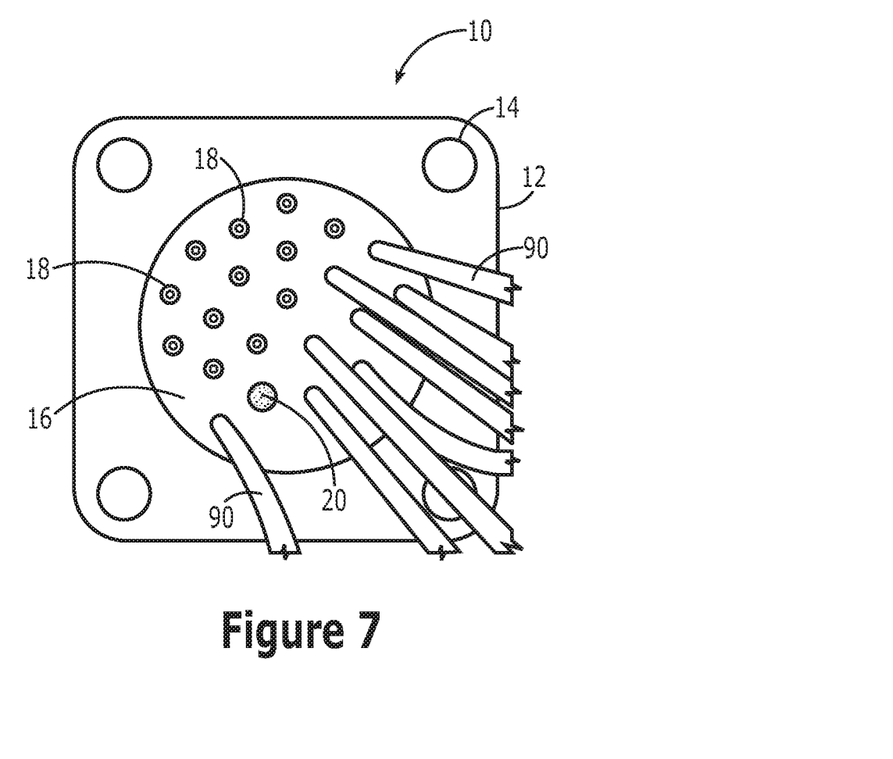
FIG. 7 is a perspective view of a rubber grommet connector in which a plurality of wire ends have been inserted into respective candidate contact insertion holes in accordance with an example embodiment of the present disclosure.

The resulting list of candidate contact insertion holes and associated contact ID numbers and locations in the connector-based coordinate system may then be utilized to facilitate insertion of wire ends into respective wire contact insertion holes 18 of the connector 10. In this regard, a wire may be identified by a wiring diagram or the like to be inserted into a particular wire contact insertion hole 18 of the connector 10 (and, in some embodiments, also into electrical contact with a respective wire contact that is aligned with the wire contact insertion hole) with the particular wire contact insertion hole being identified by a contact ID number. Prior to insertion into the wire contact insertion hole of the connector 10, a wire contact is generally connected to, e.g., crimped upon, a bare end of the wire to form a wire end. Based upon the contact ID numbers and corresponding locations of the candidate contact insertion hole for the connector 10, a wire end may be inserted into the connector at the location associated with a candidate contact insertion hole having the contact ID number of the wire contact insertion hole 18 into which the wire is to be inserted. As shown in block 80 of FIG. 6, the computing device 34, such as the processing circuitry 36, is configured to determine the candidate contact insertion hole into which a wire is to be inserted based upon the contact ID number of a candidate contact insertion hole, such as based upon correspondence between the contact ID number of a candidate contact insertion hole and the contact ID number of the wire contact insertion hole 18 into which the wire end is to be inserted as defined by a wiring diagram or the like. The computing device 34, such as the processing circuitry 36, is also configured to determine the position of a robot 44 and, more particularly, a robotic end-effector utilized to insert the wire end into the candidate contact insertion hole based upon the location of the candidate contact insertion hole in the connector-based coordinate system. See block 82 of FIG. 6. As such, the computing device 34, such as the processing circuitry 36, may effectively drive a robot 44, such as a robotic end-effector, or otherwise provide information, such as a list of candidate contact insertion holes, contact ID numbers and corresponding locations in the connector-based coordinate system, to the robot sufficient to drive the robotic end-effector in such a manner as to insert the wire ends of a wire bundle assembly into corresponding wire contact insertion holes 18. See, for example, FIG. 7 in which a plurality of wires 90 have been inserted into respective wire contact insertion holes 18 of the connector 10 in order to establish mechanical connection between the wire ends and the connector 10. By facilitating the automation of the connection process associated with a wire bundle assembly, the system 30, method and computer program product of an example embodiment increase the efficiency with which wire ends of a wire bundle assembly may be mechanically connected to a connector 10 and correspondingly reduce the error rate and cost of the resulting assembly.

As described above, FIGS. 4 and 6 illustrate flowcharts of a system 30, method, and computer program product according to example embodiments of the present disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 38 of a system 30 employing an embodiment of the present disclosure and executed by the processing circuitry 36 of the system 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method implemented by a computing device for identifying wire contact insertion holes defined by a connector, the method comprising:
analyzing each of a plurality of pixels of an image of the connector to identify one or more candidate contact insertion holes for the connector, wherein the plurality of pixels are analyzed by identifying a first pixel of the plurality of pixels that has an intensity value that satisfies a first predefined criteria and, following identification of the first pixel that satisfies the first predefined criteria, determining whether the first pixel is at least partially surrounded by a ring of pixels that satisfy a second predefined criteria by having intensity values that differ from an intensity value of the first pixel by at least a predetermined threshold, wherein the ring of pixels has a radius between an inner diameter and an outer diameter, wherein the outer diameter of the ring of pixels is defined based upon a size of an outer diameter of the candidate contact insertion holes for the connector;
determining whether the one or more candidate contact insertion holes are to be consolidated and, if so, consolidating the one or more candidate contact insertion holes; and following consolidation, assigning contact identification (ID) numbers of the connector to the one or more candidate contact insertion holes.

2. A method according to claim 1 further comprising determining whether the one or more candidate contact insertion holes include one or more outliers and, if so, eliminating the one or more candidate contact insertion holes that is the outlier from further consideration prior to assigning contact ID numbers.

3. A method according to claim 1 further comprising further eliminating one or more outliers during or after assigning contact ID numbers of the connector to the one or more candidate contact insertion holes.

4. A method according to claim 1 further comprising assigning locations in a connector-based coordinate system to the one or more candidate contact insertion holes following consolidation and elimination of the one or more outliers.

5. A method according to claim 4 further comprising:
determining the candidate contact insertion hole into which a wire end is be inserted based upon the contact ID number of the candidate contact insertion hole; and
determining a position of a robotic end-effector utilized to insert the wire end into the candidate contact insertion hole based upon the location of the candidate contact insertion hole in the connector-based coordinate system.

6. A method according to claim 1 wherein analyzing each of the plurality of pixels of the image comprises identifying a pixel as a candidate contact insertion hole in an instance in which the pixel has a color that satisfies a first predefined criteria and is at least partially surrounded by a plurality of pixels that have a color that is different than the color of the pixel and that satisfy a second predefined criteria, different than the first predefined criteria.

7. A method according to claim 6 wherein the second predefined criteria is defined based upon the color of the pixel such that the pixel identified as the candidate contact insertion hole is darker than the plurality of pixels that at least partially surround the pixel.

8. A method according to claim 1 wherein consolidating the one or more candidate contact insertion holes comprises consolidating a plurality of neighboring candidate contact insertion holes to a single candidate contact insertion hole having a location based upon a combination of locations of the plurality of candidate contact insertion holes that are consolidated.

9. A method according to claim 1 wherein assigning contact ID numbers comprises comparing a predetermined template of contact locations of the connector to the candidate contact insertion holes.

10. A method according to claim 9 wherein comparing the predetermined template of contact locations of the connector to the candidate contact insertion holes comprises modifying a position of the predetermined template relative to the candidate contact insertion holes to identify a closest match between the predetermined template and the candidate contact insertion holes.

11. A system for identifying wire contact insertion holes defined by a connector, the system comprising:
a camera configured to capture an image of the connector; and
a computing device configured to:
analyze each of a plurality of pixels of the image of the connector to identify one or more candidate contact insertion holes for the connector, wherein the plurality of pixels are analyzed by identifying a first pixel of the plurality of pixels that has an intensity value that satisfies a first predefined criteria and, following identification of the first pixel that satisfies the first predefined criteria, determining whether the first pixel is at least partially surrounded by a ring of pixels that satisfy a second predefined criteria by having intensity values that differ from an intensity value of the first pixel by at least a predetermined threshold, wherein the ring of pixels has a radius between an inner diameter and an outer diameter, wherein the outer diameter of the ring of pixels is defined based upon a size of an outer diameter of the candidate contact insertion holes for the connector;
determine whether the one or more candidate contact insertion holes are to be consolidated and, if so, consolidate the one or more candidate contact insertion holes; and
following consolidation, assign contact identification (ID) numbers of the connector to the one or more candidate contact insertion holes.

12. A system according to claim 11 wherein the computing device is further configured to determine whether the one or more candidate contact insertion holes include one or more outliers and, if so, eliminate the one or more candidate contact insertion holes that is the outlier from further consideration prior to assigning contact ID numbers.

13. A system according to claim 11 wherein the computing device is further configured to further eliminate one or more outliers during or after assigning contact ID numbers of the connector to the one or more candidate contact insertion holes.

14. A system according to claim 11 wherein the computing device is further configured to assign locations in a connector-based coordinate system to the one or more candidate contact insertion holes following consolidation and elimination of the one or more outliers.

15. A system according to claim 14 wherein the computing device is further configured to:
determine the candidate contact insertion hole into which a wire end is be inserted based upon the contact ID number of the candidate contact insertion hole; and
determine a position of a robotic end-effector utilized to insert the wire into the candidate contact insertion hole based upon the location of the candidate contact insertion hole in the connector-based coordinate system.

16. A system according to claim 11 wherein the computing device is configured to analyze each of the plurality of pixels of the image by identifying a pixel as a candidate contact insertion hole in an instance in which the pixel has a color that satisfies a first predefined criteria and is at least partially surrounded by a plurality of pixels that have a color that is different than the color of the pixel and that satisfy a second predefined criteria, different than the first predefined criteria.

17. A system according to claim 16 wherein the second predefined criteria is defined based upon the color of the pixel such that the pixel identified as the candidate contact insertion hole is darker than the plurality of pixels that at least partially surround the pixel.

18. A system according to claim 11 wherein the computing device is configured to consolidate the one or more candidate contact insertion holes by consolidating a plurality of neighboring candidate contact insertion holes to a single candidate contact insertion hole having a location based upon a combination of locations of the plurality of candidate contact insertion holes that are consolidated.

19. A system according to claim 11 wherein the computing device is configured to assign contact ID numbers by comparing a predetermined template of contact locations of the connector to the candidate contact insertion holes.

20. A computer program product for identifying wire contact insertion holes defined by a connector, the computer program product comprising at least one non-transitory computer-readable storage medium having computer-executable program code instructions stored therein, the computer-executable program code instructions comprising program code instructions to:

analyze each of a plurality of pixels of an image of the connector to identify one or more candidate contact insertion holes for the connector, wherein the plurality of pixels are analyzed by identifying a first pixel of the plurality of pixels that has an intensity value that satisfies a first predefined criteria and, following identification of the first pixel that satisfies the first predefined criteria, determining whether the first pixel is at least partially surrounded by a ring of pixels that satisfy a second predefined criteria by having intensity values that differ from an intensity value of the first pixel by at least a predetermined threshold, wherein the ring of pixels has a radius between an inner diameter and an outer diameter, wherein the outer diameter of the ring of pixels is defined based upon a size of an outer diameter of the candidate contact insertion holes for the connector;

determine whether the one or more candidate contact insertion holes are to be consolidated and, if so, consolidate the one or more candidate contact insertion holes; and     following consolidation, assign contact identification (ID) numbers of the connector to the one or more candidate contact insertion holes.

\* \* \* \* \*